United States Patent [19]

Maddock

[11] 4,426,807
[45] Jan. 24, 1984

[54] HERBICIDE APPLICATOR FOR USE ON A VEHICLE

[76] Inventor: Mitchell E. Maddock, Rte. 1, Box 24AA, Florence, Ariz. 85232

[21] Appl. No.: 386,634

[22] Filed: Jun. 9, 1982

Related U.S. Application Data

[63] Continuation-in-part of Ser. No. 198,664, Oct. 20, 1980, abandoned, which is a continuation-in-part of Ser. No. 78,654, Sep. 24, 1979, abandoned, which is a continuation-in-part of Ser. No. 72,147, Sep. 4, 1979, Pat. No. 4,305,224.

[51] Int. Cl.$^3$ ............................................ A01M 21/00
[52] U.S. Cl. ........................................ 47/1.5; 47/1.7; 239/172; 138/DIG. 8
[58] Field of Search .................... 47/1.5, 1.7; 401/203, 401/204; 239/145, 172, 175; 138/DIG. 8

[56] References Cited

U.S. PATENT DOCUMENTS

| | | | |
|---|---|---|---|
| 895,472 | 8/1908 | Knickerbocker | 401/203 |
| 3,048,537 | 8/1962 | Pall et al. | 401/198 UX |
| 3,077,701 | 2/1963 | Osmun | 47/1.5 |
| 4,307,754 | 12/1981 | Muratsubaki | 138/DIG. 8 |
| 4,310,988 | 1/1982 | Porter, Jr. | 47/1.5 |

FOREIGN PATENT DOCUMENTS 32671 10/1964 German Democratic Rep. ... 47/1.5

OTHER PUBLICATIONS

"The Rope Wick Applicator: A New Method of Applying Herbicides"; J. E. Dale; dated 7/5/78.

Primary Examiner—William Pieprz
Assistant Examiner—David A. Wiecking
Attorney, Agent, or Firm—Herbert E. Haynes, Jr.

[57] ABSTRACT

A liquid herbicide applicator mechanism mountable on a farming vehicle for wipingly applying the herbicide on undesired vegetation growing in a cultivated field. The applicator mechanism includes a tool bar for carrying a plurality of herbicide dispenser assemblies so that they alternately align with the rows of crop plants and the spaces therebetween as the vehicle moves through the cultivated field. Each of the herbicide dispenser assemblies receives the herbicide from a reservoir tank under the influence of gravity and has a herbicide wiper head which absorbs the herbicide for wiping application on the undesired vegetation. Each of the herbicide wiper heads is substantially rigid but deformably configurable so that it may be shaped into substantial conformity with the contour of the crop plant rows and the spaces in the cultivated field and each wiper head is provided with special absorbent wiper elements.

23 Claims, 9 Drawing Figures

HERBICIDE APPLICATOR FOR USE ON A VEHICLE

CROSS-REFERENCE TO RELATED APPLICATIONS

This application is a continuation-in-part of pending prior application Ser. No. 198,664, filed Oct. 20, 1980 now abandoned, for: HERBICIDE APPLICATOR FOR A MECHANIZED VEHICLE, which in turn is a continuation-in-part of prior application Ser. No. 078,654, filed Sept. 24, 1979, for: HERBICIDE APPLICATOR FOR A MECHANIZED VEHICLE and now abandoned, which is in turn a continuation-in-part of prior application Ser. No. 072,147, filed Sept. 4, 1979, for: AN APPARATUS FOR SELECTIVE APPLICATION OF HERBICIDE, which issued on Dec. 15, 1981, as U.S. Pat. No. 4,305,224, all by the same inventor.

BACKGROUND OF THE INVENTION

1. Field of the Invention

This invention relates to the application of herbicides and more particularly to an apparatus carried by a farm machine and adapted to wipingly apply liquid herbicide on undesired vegetation in cultivated fields.

2. Description of the Prior Art

The prior art is replete with mechanisms which are carried by wheeled vehicles for the purpose of wipingly or sprayingly applying insecticides on crop plants growing in cultivated fields.

U.S. Pat. No. 1,109,060, issued on Sept. 1, 1914, to W. F. Griffin discloses a vehicle including mechanisms for applying insecticide to crop plants. The vehicle has a support frame extending rearwardly therefrom to support a transverse pipe which extends horizontally across the back of the vehicle. A liquid reservoir tank is disposed above the pipe and is connected thereto to supply liquid to the center of the pipe. The pipe is provided with three suitable flow control valves, one depending from the mid point of the pipe and the other two depending from the opposite ends thereof. Each of the valves are coupled to the mid points of a different one of three separate horizontally disposed perforated pipes each of which supports a depending fabric apron of sheet-like configuration. Liquid flows from the reservoir tank to the transverse pipe and through the control valves to the perforated pipes. The liquid emerging from the perforated pipes will saturate the aprons which wipingly apply the liquid on the crop plants as the vehicle is moved through the field.

U.S. Pat. No. 2,223,809, issued on Dec. 3, 1940, to H. M. B. Rucker discloses another vehicle having a mechanism thereon for wipingly applying insecticide on crop plants. The vehicle includes a transverse rockshaft supported atop standards carried on the rear of the vehicle. A pair of coupling blocks are carried adjacent the opposite ends of the rockshaft and are longitudinally adjustable thereon. Each of these coupling blocks has a vertically adjustable rod carried therein with an insecticide applying device mounted on the lower end of the vertical rod. The insecticide applying device includes a longitudinally extending horizontal conduit for receiving liquid insecticide from a tank carried on the vehicle and delivering it to horizontally disposed cross pipes at the opposite ends of the conduit. Each of the cross pipes is provided with a pair of mop-like depending wiper elements which absorb the insecticide and wipingly apply it to the crop plants. The rockshaft is coupled to one of the vehicle's wheels in a manner which results in the applicator device swinging in an arc as the vehicle moves through the field.

U.S. Pat. No. 1,518,305, issued on Dec. 9, 1924, to H. V. Carmans discloses a wheeled vehicle including plural brush assemblies A, B, and C and apparatus for spraying liquid insecticide through the brushes onto the crop plants. Brush assembly A is at the front of the vehicle and is reciprocally moved in a vertical plane to brush the crop plants and spray them with insecticide. Brush assembly B is fixed at the back of the machine at a height which brushes the tops of the crop plants and again, liquid herbicide is sprayed through the brush assembly B onto the crop plants. Brush assemblies C are disposed at opposite sides of the machine and are reciprocally movable in a path longitudinal of the machine to sweep Weevils dislodged by brushes A toward the center of the machine into the spray path of brushes B.

The purposes of each of these above discussed prior art structures is to apply liquid insecticide directly on and in the vicinity of crop plants growing in a cultivated field. The application of liquid herbicide on the other hand poses entirely different problems in that in order to be effective, the herbicide must be applied to undesired vegetation while avoiding contact with the crop plants. In other words, selective application of a liquid herbicide is critical, whereas, application selectivity of liquid insecticide is of little or no consequence. For this basic reason, spray techniques per se, such as that taught by the Carmans patent is unsuited in that no selective application is possible with a spray. The prior art trailing wiping elements, such as the fabric aprons of the Griffin patent and the mop-like elements of the Rucker patent, are also unsuited for selective application of herbicide, in that they can be readily deflected, or otherwise moved, out of their intended path of movement into an unintended path. If either of these prior art structures were employed to apply herbicide on noxious weeds, due to their non-rigid character, they could be deflected by weeds, blown by winds, or otherwise moved into contact with crop plant and this would, of course, destroy the crop plants.

In addition, liquid leakage such as dripping, from any of the plural wiper elements is of no particular consequence in devices that are employed for the application of insecticides. However, leakage must be prevented in herbicide applicator devices to prevent destruction of the crop plants.

In addition to conventional herbicides which burn vegetation, a comparatively new type of herbicide has been developed which is sometimes referred as a systemic herbicide. A systemic herbicide is one which will be absorbed by the vegetation to which it is applied and will permeate the vegetation to kill the root systems without effecting the soil in any way. Both conventional and systemic herbicides may be applied by the well known spray technique when complete destruction of all plant life in the sprayed area is desired. However, selective herbicidal tasks, such as weeding operations require that the herbicide be selectively applied only to the vegetation that is to be destroyed.

As is well known, weeds will normally outgrow crop plants particularly in the early stages of crop growth, and a particular prior art herbicide applicator mechanism has been suggested which takes advantage of this differential in growth rates. This particular prior art device is fully disclosed in U.S. Pat. No. 4,019,278, as including a pair of spaced parallel rigid tubes supportingly carried on a tractor so as to extend transversely thereof. The tubes are in a closed loop configuration and are connected to a source of liquid herbicide with a flow control device interposed therebetween. The liquid herbicide flows into the tubes and coates the exterior surfaces thereof and by movement of the tractor through the cultivated field, the herbicide is wiped on the tops of weeds which have outgrown the crop plants. The two tubes are suggested as being configured in either of two embodiments, one being a porous plastic and the other being a wicking element in the form of a sleeve-like member which circumscribes a drilled tube. The spaced tubes are attached to a supporting structure provided on the tractor, which can be raised and lowered hydraulically.

This prior art device, and others similar thereto, have not achieved any appreciable commercial success for several reasons. The first of these reasons is a problem of liquid distribution. The portion of tubular wicking elements nearest the source of the herbicide becomes overly wetted while those portions remote from the source are comparatively dry. The excessively wet portions of the wicking element can become so wet that they drip, and uncontrolled dripping can kill the desired crop plants. The relatively dry portions on the other hand become so dry that insufficient amounts of the herbicide are applied so that many weeds are not destroyed. This inherent problem is further complicated when the mechanized vehicle is operating on a slope, in that one end of the closed loop tubular wicking element will become overly wetted while the other becomes dry.

A second problem, or shortcoming, with the above described prior art structure is that it makes no provisions for wipingly applying herbicide to undesired vegetation growing in the furrows, or spaces between the crop plants.

A further problem, or shortcoming associated with this prior art device is that its wiper elements are rigid non-formable structures which lie in a substantially horizontal plane and the only adjustment, which is provided by the tractor, is that the height of the horizontal plane of the wiper elements can be raised and lowered to just clear the tops of the crop plants. This rigid non-formability of the wiper elements permits the liquid herbicide to be wipingly applied only on the noxious weeds which are taller than the crop plants, and this, in conjunction with the above discussed second problem, or shortcoming, results in the application of herbicide only on a relatively small percentage of the weeds growing in a cultivated field.

Another prior art device has been devised for applying liquid herbicide on noxious weeds growing in the furrows, or spaces between crop plants. This device includes a wicking element carried on the front of a farm machine with the wicking element being positioned at the rear opening of forwardly diverging plates which deflect the undesired vegetation into contact with the wicking element. This device is positioned so that it lies in the furrow between crop plants and will wipingly apply the herbicide on the inwardly deflected undesired vegetation in the furrow. Such a device is limited as to its width in that the diverging plates cannot be allowed to come to close to the crop plants lest they strikingly damage the crop plants or deflect them into contact with the wicking element.

Therefore, a need exists for a new and improved liquid herbicide applicator mechanism which overcomes some of the problems and shortcomings of the prior art.

SUMMARY OF THE INVENTION

In accordance with the present invention, a new and improved applicator mechanism is disclosed for selectively applying a liquid herbicide on undesired vegetation growing in a cultivated field, with the applicator mechanism being adapted to be mounted on and moved through the field by a suitable farming vehicle, such as a tractor.

Although any suitable farming vehicle may be utilized, it is preferred that it be of the type which is equipped to carry what is commonly referred to as a tool bar and provide means for raising and lowering the tool bar relative to the ground. A tool bar is an elongated beam member, usually of square in cross section tubular configuration which is mounted to lie in a substantially horizontal plane transversely of the farming vehicle either at the front or back thereof. A tool bar is employed to demountably carry the various devices employed in farming operations such as seed dispensers and the like.

The applicator mechanism of the present invention includes a tool bar which is preferably sized as to its length so that it spans plural crop rows and the spaces, or furrows, therebetween. An elevated herbicide reservoir tank, which may be mounted on the tool bar or on any convenient location on the farming vehicle, is provided to supply the liquid herbicide under the influence of gravity through a shutoff valve and filter to a flow divider manifold which directs the herbicide to a plurality of liquid herbicide dispenser assemblies. The plurality of individual liquid herbicide dispenser assemblies are mounted in spaced increments along the length of the tool bar with each of the dispenser assemblies extending from the tool bar toward the ground. The dispenser assemblies are substantially identical devices but are configured to provide upper and lower dispenser assemblies which are alternately arranged along the length of the tool bar. The upper herbicide dispenser assemblies are each disposed to align with and be spaced above a different row of crop plants and each of the lower dispenser assemblies are disposed to align with and extend into different ones of the spaces, or furrows, between the crop plants.

Each of the liquid herbicide dispenser assemblies includes an elongated conduit which is demountably clamped on the tool bar with the upper end of the conduit being connected to receive the herbicide from the flow divider manifold. A flow control valve and sight tube is mounted in each conduit adjacent the upper end thereof so that the flow of liquid herbicide may be regulated. The lower end of each conduit is provided with a special liquid herbicide wiper head assembly which absorbingly receives the liquid herbicide from the conduit and wipingly applies it on undesired vegetation as the farm vehicle moves the applicator mechanism through the cultivated field.

The conduit of each dispenser assembly is coupled intermediate the opposite ends of its wiper head assembly so as to be in liquid delivering communication therewith and to divide the wiper head assembly into two wiper arms which extend substantially laterally and oppositely from the lower end of the conduit. Each of the arms of the wiper head assemblies are substantially rigid structures which prevent undesired in use movement such as deflection into contact with crop plants, but are deformably configurable so that the wiper head assemblies may be shaped into close conformity with the particular crop plant growth, space, or furrow configuration and other variables which naturally occur in cultivated fields as determined by the types of crop plants, age of the crop plants and the like.

In the preferred embodiment, each of the wiper arms of the substantially rigid but deformably configurable wiper head assemblies includes a flexible tube which is in liquid receiving communication with the conduit and contains an elongated deformable rigidifying element which allows the arms of the wiper head assembly to be deformed into the desired configuration and yet provides the rigidity needed for proper use of the applicator mechanism. The flexible tubes of the wiper head assembly are provided with selectively openable liquid herbicide dispenser ports through which the herbicide is properly directed to special absorbent wiper elements which are coaxially and coextendingly mounted on the flexible tubes. The absorbent wiper element are each preferably in the form of a synthetic sponge having an absorbent relatively dense porous peripheral skin which retards surface wetting of the sponge until complete saturation of the internal sponge body is complete to prevent uncontrollable liquid flow from the sponge due to channelization, localized oversaturation, and the like, to provide uniformly wettable dripless wiper head assemblies.

Accordingly, it is an object of the present invention to provide a new and improved applicator mechanism which is mountable on a farming vehicle for movement through a cultivated field with the applicator mechanism being configured for wipingly applying liquid herbicide on undesired vegetation growing in the cultivated field.

Another object of the present invention is to provide a new and improved liquid herbicide applicator mechanism of the above described character for simultaneously wipingly applying the liquid herbicide on undesired vegetation which has outgrown the crop plants in the cultivated field and on undesired vegetation growing in the spaces, or furrows, between the rows of crop plants.

Another object of the present invention is to provide a new and improved liquid herbicide applicator mechanism of the above described type which is configured to span a plurality of rows of crop plants and the spaces, or furrows, in the cultivated field and simultaneously wipingly apply the herbicide on the undesired vegetation growing in that plurality of crop rows and spaces, or furrows.

Another object of the present invention is to provide a new and improved liquid herbicide applicator mechanism of the above described character which includes a plurality of individual herbicide dispenser assemblies which are spacedly arranged along the length of a tool bar so as to be in alignment with each of the spanned crop rows and spaces, or furrows, therebetween.

Still another object of the present invention is to provide a new and improved liquid herbicide applicator of the above described type wherein each of the individual herbicide dispenser assemblies includes a herbicide wiper head assembly which is a substantially rigid structure to prevent undesired deflection or other movement into contact with crop plants during use, and yet is deformably configurable so that the wiper head assemblies may be shaped to closely conform with the crop plant foliage, spacing between the crop rows, furrow configuration, and other variables in the cultivated field.

Yet another object of the present invention is to provide a new and improved liquid herbicide applicator mechanism of the above described character wherein the wiper head assemblies of each of the herbicide dispenser assemblies includes at least one synthetic sponge having an absorbent relatively dense porous peripheral skin which retards surface wetting until internal sponge saturation is completed to prevent uncontrollable herbicide leakage, such as dripping and localized heavy flow.

The foregoing and other objects of the present invention, the various features thereof, and the invention itself, may be more fully understood from the following description when read in conjunction with the accompanying drawings.

DESCRIPTION OF THE PREFERRED EMBODIMENT

Figure 1:
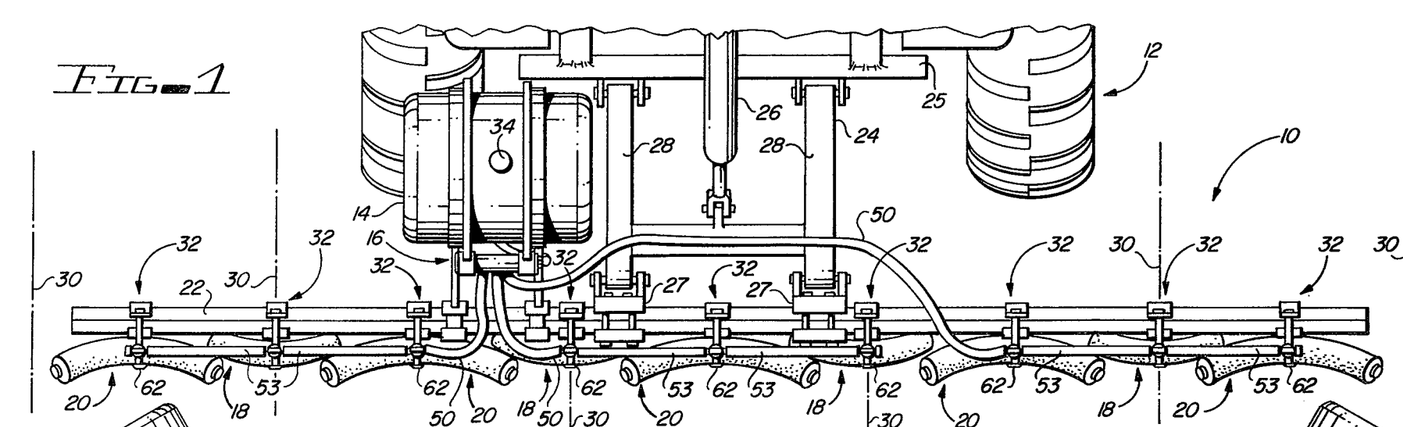
FIG. 1 is a plan view of the liquid herbicide applicator mechanism of the present invention showing the various features thereof and also illustrating a suitable manner in which the mechanism may be mounted on a farming vehicle which is fragmentarily illustrated.
Figure 2:
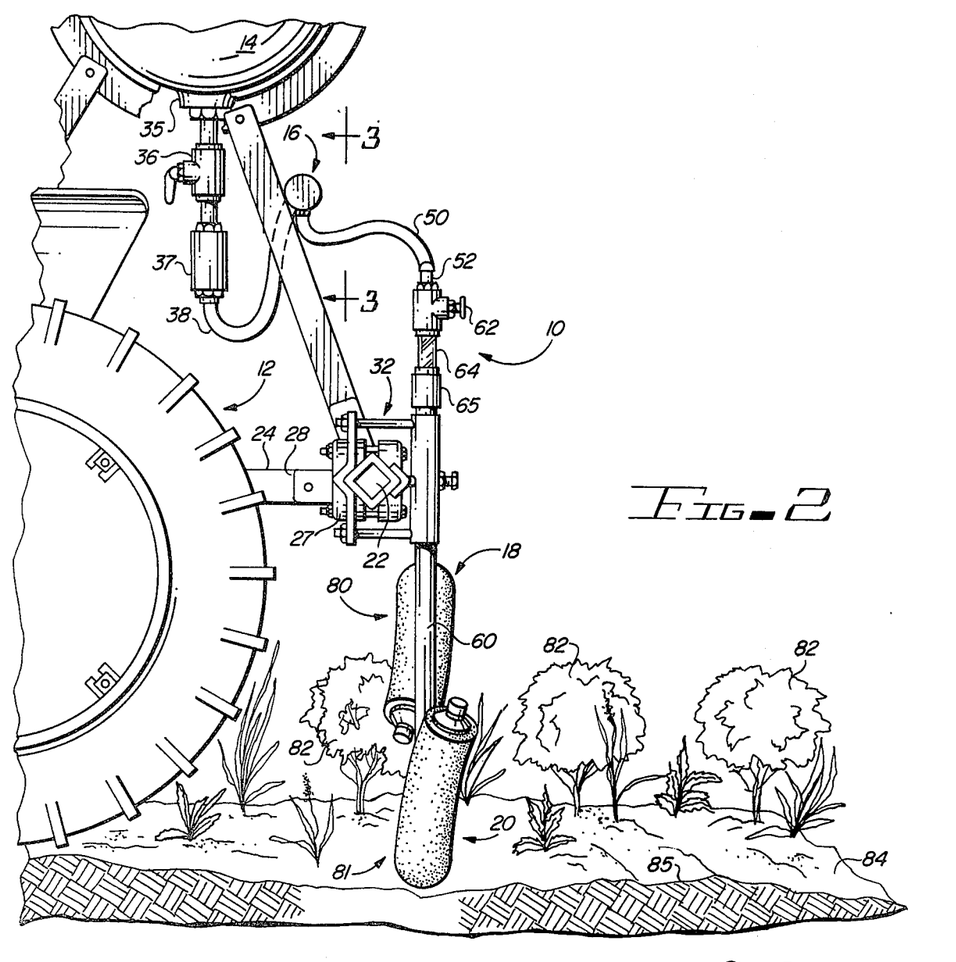
FIG. 2 is an enlarged side elevational view of the mechanism shown in FIG. 1.

Referring more particularly to the drawings, FIGS. 1 and 2 illustrate the herbicide applicator mechanism of the present invention as being mounted on a suitable farming vehicle, such as a tractor, with the applicator mechanism being indicated generally by the reference numeral 10, and the tractor being indicated by the reference numeral 12.

As will hereinafter be described in detail, the herbicide applicator mechanism 10 includes the major elements of a liquid herbicide reservoir tank 14 which supplies the herbicide (not shown) under the influence of gravity to a flow divider manifold 16 which in turn directs the herbicide to a plurality of upper herbicide dispenser assemblies 18 and a plurality of lower herbicide dispenser assemblies 20 which are alternately and spacedly arranged along the length of a tool bar 22.

The tractor 12, which as hereinbefore mentioned, may be any suitable farming machine, is preferably provided with a tool bar carrying means 24 mounted on its frame 25 with the carrying means 24 being capable of raising and lowering the tool bar 22 relative to the ground, with such raising and lowering being accomplished, for example, by means of a hydraulic ram 26. A spaced apart pair of clamps 27 are provided on the extending members 28 of the carrying means 24 for demountably attaching the tool bar 22 thereto.

As seen best in FIG. 1, the tool bar 22 is an elongated beam with the clamps 27 being attached thereto intermediate the opposite ends of the tool bar. This places the tool bar 22 in a substantially horizontal attitude and transverse to the longitudinal axis of the tractor 12. The illustrated tool bar 22 is sized as to its length so that it spans four rows of crop plants and five spaces, or furrows, therebetween, with the crop rows being represented in FIG. 1 by crop row centerlines 30. It will be understood, however, that the tool bar 22, and thus the mechanism 10, may be sized to span any desired number of crop rows and the spaces, or furrows, therebetween within practical limits.

The plural upper and lower liquid herbicide dispenser assemblies 18 and 20 are alternately and spacedly arranged along the length of the tool bar 22, so that the upper assemblies 18 are disposed to align with different ones of the crop rows 30, and the lower assemblies 20 are disposed to align with the spaces, or furrows, therebetween. In order to compensate for various spacing, which may occur from one cultivated field to another, the upper and lower herbicide dispenser assemblies 18 and 20 are clampingly mounted on the tool bar 22 by slidably repositionable clamps 32 which will hereinafter be described in detail.

The liquid herbicide reservoir tank 14, which may be of any suitable configuration, is provided with a suitable fill port 34 on top of the tank and an outlet port 35 on the bottom thereof. The reservoir tank 14 may be mounted in any suitable location such as on the tractor 12, on the tool bar 22, or on both, with the only requirement being that it be elevated in relation to the herbicide dispenser assemblies 18 and 20, so that the flow of liquid herbicide from the tank 14 to the assemblies 18 and 20 will occur as the result of gravity.

Figure 3:
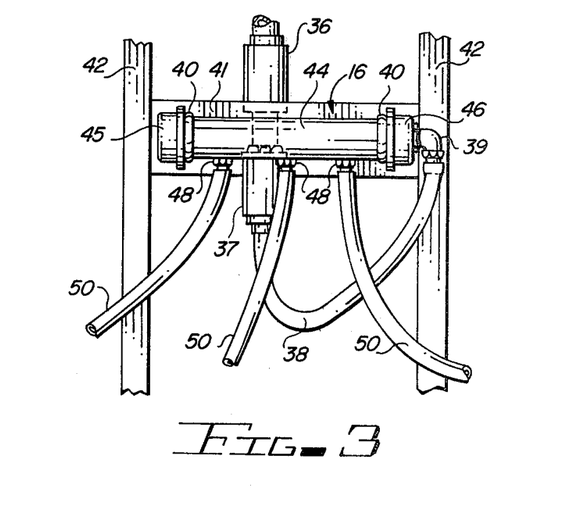
FIG. 3 is an enlarged fragmentary view taken on the line 3—3 of FIG. 2.

As shown in FIGS. 2 and 3, the liquid herbicide will emerge from the outlet port 35 of the supply reservoir tank 14 and will pass sequentially through a manual shutoff valve 36 and a suitable filter 37. A flex-hose 38 is coupled between the outlet port of the filter 37 and an inlet fitting 39 provided on one end of the flow divider manifold 16. The manifold 16 may be mounted in any suitable location as long as it is below the reservoir tank 14 and above the plural herbicide dispenser assemblies. The flow divider manifold 16 is illustrated as being attached by a pair of U-bolts 40 to a cross-member 41, which is fixed, such as by welding, so as to extend between a spaced pair of reservoir tank support members 42. The flow divider manifold 16 includes a tubular body 44 which is closed on its opposite ends by suitable caps 45 and 46 with the cap 46 having the fitting 39 mounted therein by which the flex-hose 38 is coupled to the manifold. The body 44 has a plurality of fittings 48 mounted therein with there being three of such fittings in the illustrated embodiment. Each of the fittings 48 have a flex-line 50 connected thereto with each of these lines being connected, as will hereinafter be described, to supply the liquid herbicide to different groups of the plural herbicide dispenser assemblies 18 and 20. It has been found that each one of the flex-lines 50 having, for example, a ⅜ inch inside diameter, can provide a sufficient quantity of the herbicide to a group of three of the plural dispenser assemblies 18 and 20 to accomplish a relatively rapid initial wetting thereof, as will hereinafter be described in detail.

Figure 5:
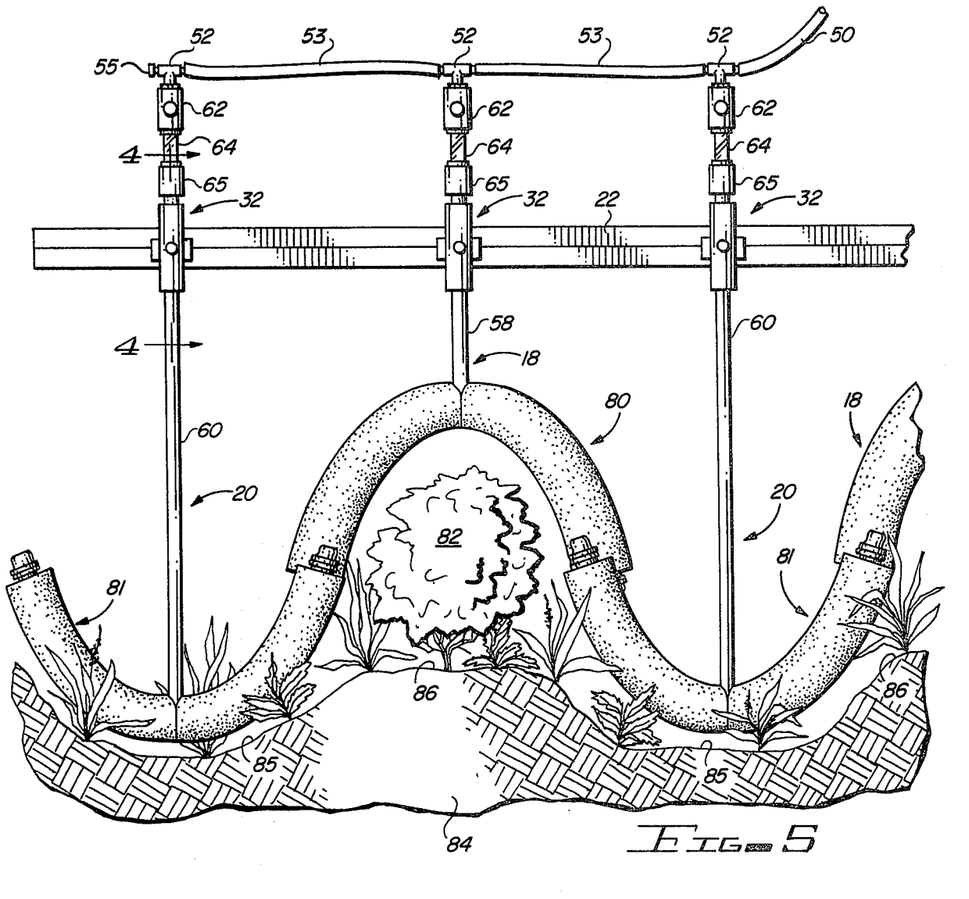
FIG. 5 is a fragmentary rear elevational view showing a typical group of three of the plurality of individual herbicide dispenser assemblies of the mechanism and illustrating one possible configuration of the substantially rigid but deformably configurable wiper head assembly which may be used when wipingly applying the herbicide on undesired vegetation growing in a cultivated field.

FIG. 5 shows a typical one of the groups of three herbicide dispenser assemblies which are supplied by a single one of the flex-lines 50. As shown, the flex-line 50 is connected to one branch of a tee-fitting 52 provided at the upper end of the first dispenser assembly 20 of the illustrated group, and a coupling hose 53 extends between that tee-fitting 52 and a similar tee-fitting 52 provided at the upper end of the second dispenser assembly 18 of the illustrated group. A second coupling hose 53 extends between the fitting 52 of the second dispenser assembly 18 and a similar fitting 52 is provided on the upper end of the third and last dispenser assembly 20 of the illustrated group, with this last fitting being capped as at 55. In this manner, liquid herbicide is supplied to all of the dispenser assemblies 18 and 20 of the applicator mechanism 10.

The upper and lower herbicide dispenser assemblies 18 and 20 are similar structures with one exception being that a tubular conduit 58, which is one part of each of the upper assemblies 18, in relatively shorter than a similar tubular conduit 60 of each of the lower assemblies 20.

A manually adjustable flow control valve means 62 is coupled at the upper end of each of the tubular conduits 58 and 60 of the upper and lower dispenser assemblies 18 and 20 respectively, with these valves being employed to regulate the flow of liquid herbicide into their respective assemblies 18 and 20. The above described tee-fittings 52 are mounted on the inlet sides of the valves 62 and transparent sight tubes 64 are connected to the outlet ends of the valves to facilitate accurate and even flow into each of the dispenser assemblies. The flow control valves 62 and sight tubes 64 are mounted on the upper ends of the tubular conduits 58 and 60 of the dispenser assemblies 18 and 20 respectively, such as by means of suitable union fittings 65.

Figure 4:
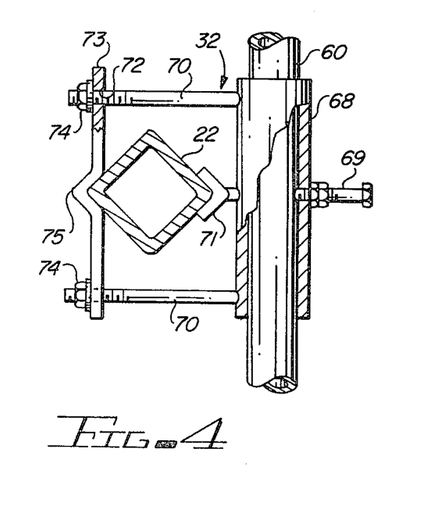
FIG. 4 is an enlarged fragmentary sectional view taken along the line 4—4 of FIG. 5.

As hereinbefore mentioned, the herbicide dispenser assemblies 18 and 20 are clampingly attached to the tool bar 22 by means of the clamps 32. These plural clamps 32 are identical structures and the following description of a typical one of these clamps 32, which is shown in FIG. 4 as being associated with one of the lower dispenser assemblies 20, will be understood to also apply to the other clamps 32.

The clamp 32 includes a tubular sleeve 68 in which the conduit 60 of the dispenser assembly 20 is axially and slidably disposed. A lock bolt/jamb nut arrangement 69 is provided in the sleeve for holding the conduit 60, and thus the dispenser assembly 20 in a desired position relative to the tool bar 22. A pair of aligned elongated threaded studs 70 extend radially from opposite ends of the sleeve 68 and a V-shaped saddle 71 similarly extends from the sleeve intermediate its opposite ends. With the saddle 71 in bearing engagement with one edge of the tool bar 22, the threaded studs 70 straddle the tool bar and pass through holes 72 provided in the opposite ends of a retainer plate 73. Suitable nuts 74 are threadingly mounted on the ends of the studs and hold a V-shaped central portion 75 of the retainer plate 73 in bearing engagement with the opposite edge of the tool bar.

Each of the upper liquid herbicide dispenser assemblies 18 have a wiper head assembly 80 mounted on the lower end of its conduit 58 and the lower herbicide dispenser assemblies 20 are similarly provided with wiper head assemblies 81, both of which cooperate for wipingly applying the herbicide on undesired vegetation growing in a cultivated field. As will hereinafter be described in detail, the wiper head assemblies 80 and 81 are substantially rigid, i.e., will resist shape changes, to prevent unintentional movement out of their intended movement path through the cultivated field, such as could be caused by their moving into deflecting engagement with larger weeds or other obstacles. However, the wiper head assemblies 80 and 81 are each deformably configurable so that they can be shaped into close conformity with the contour characteristics of the crop plants and spaces therebetween in the various cultivated fields that are to be treated by the applicator mechanism 10.

One example of a configuration of the shape retaining but deformably configurable wiper head assemblies 80 and 81 is shown in FIGS. 2 and 5 wherein those head assemblies are shaped to substantially conform with the contour characteristics of the cultivated field 84 which is defined by a particular growth pattern of a crop plant 82 and the ground configuration of the cultivated field. The cultivated field 84, is shown as having been plowed to form furrows 85 on each side of the mound 86 upon which the drop plants 82 are growing, and the crop plants 82 are seen to have their foliage in a more or less spherical shape. Under such contour characteristics of the cultivated field, the wiper head assemblies 81 of the lower herbicide dispenser assemblies 20 are ideally deformably configured into upwardly opening arcs of substantially semi-circular shape and thus closely conform to the shape of the furrows. And, the wiper head assemblies 80 of the upper dispenser assemblies 18 are similarly shaped but are inverted so that they straddlingly overlay the crop plants 82 with the ends of the wiper head assemblies 80 of the upper dispenser assemblies 18 being disposed to be in an overlapped relationship with respect to the ends of the wiper head assemblies 81 of the lower dispenser assemblies 20. In this manner, the wiper head assemblies 80 and 81 cooperatively form an undulating continuous wiper assembly resembling a sine wave as shown in FIG. 5, and such a wiper configuration will apply herbicide to virtually any undesirable vegetation growing in the field 84.

Figure 6:
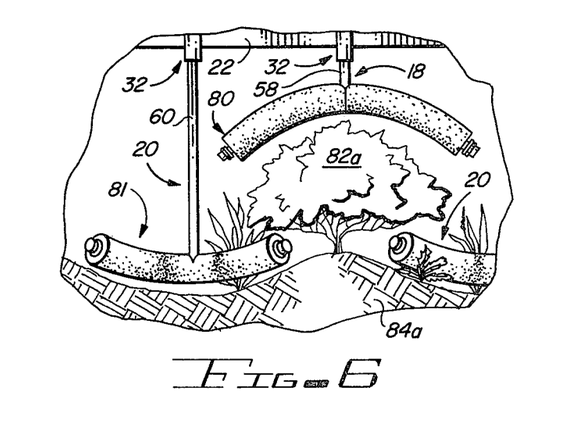
FIG. 6 is a view similar to FIG. 5, on a reduced scale, and showing another possible configuration of the substantially rigid but deformably configurable wiper head assemblies.
Figure 7:
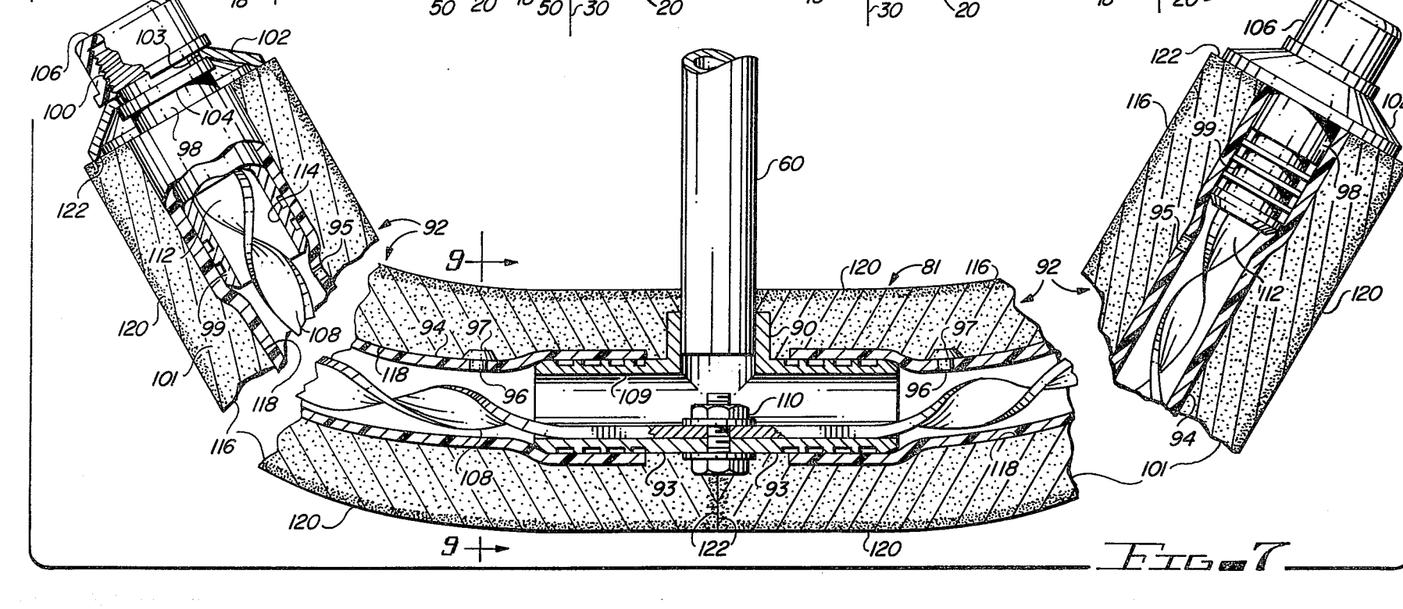
FIG. 7 is a fragmentary sectional view of a typical one of the wiper head assemblies to show the various features thereof and to show the liquid flow porting arrangement employed when the head assembly is deformably configured into an upwardly opening arcuate shape.

FIG. 6 shows another deformably configurable wiper head assembly shape which is ideally suited for a cultivated field 84a having different contour characteristics, which are defined by the crop plants such as those shown at 82a whose foliage patterns differ from those discussed above, in that the foliage is somewhat flatter and extends oppositely and laterally from the plant's stock to a greater extent than does the crop plants 82 discussed above. In such cases, the wiper head assemblies 80 of the upper dispenser assemblies 18 (not shown) are deformably shaped into a downwardly opening curve which may be defined as having a significantly large radius in comparison to the configuration shown in FIG. 5. The wiper head assemblies 81 of the lower dispenser assemblies 20 are shaped to substantially conform to the shape of the furrow in that the central portions thereof are relatively flat and the opposite ends curve upwardly and rearwardly of the direction of travel of the farm vehicle 12. In this manner, the lower wiper head assemblies 81 are disposed to extend from the furrows towards the stocks of the crop plants 82a beneath the foliage thereof.

It will be seen from the two hereinbefore discussed examples of possible configurations of the rigid but deformably configurable wiper head assemblies 80 and 81, that they may be shaped as needed to substantially conform to the various contour characteristics of virtually any cultivated field.

Figures 8, 9:
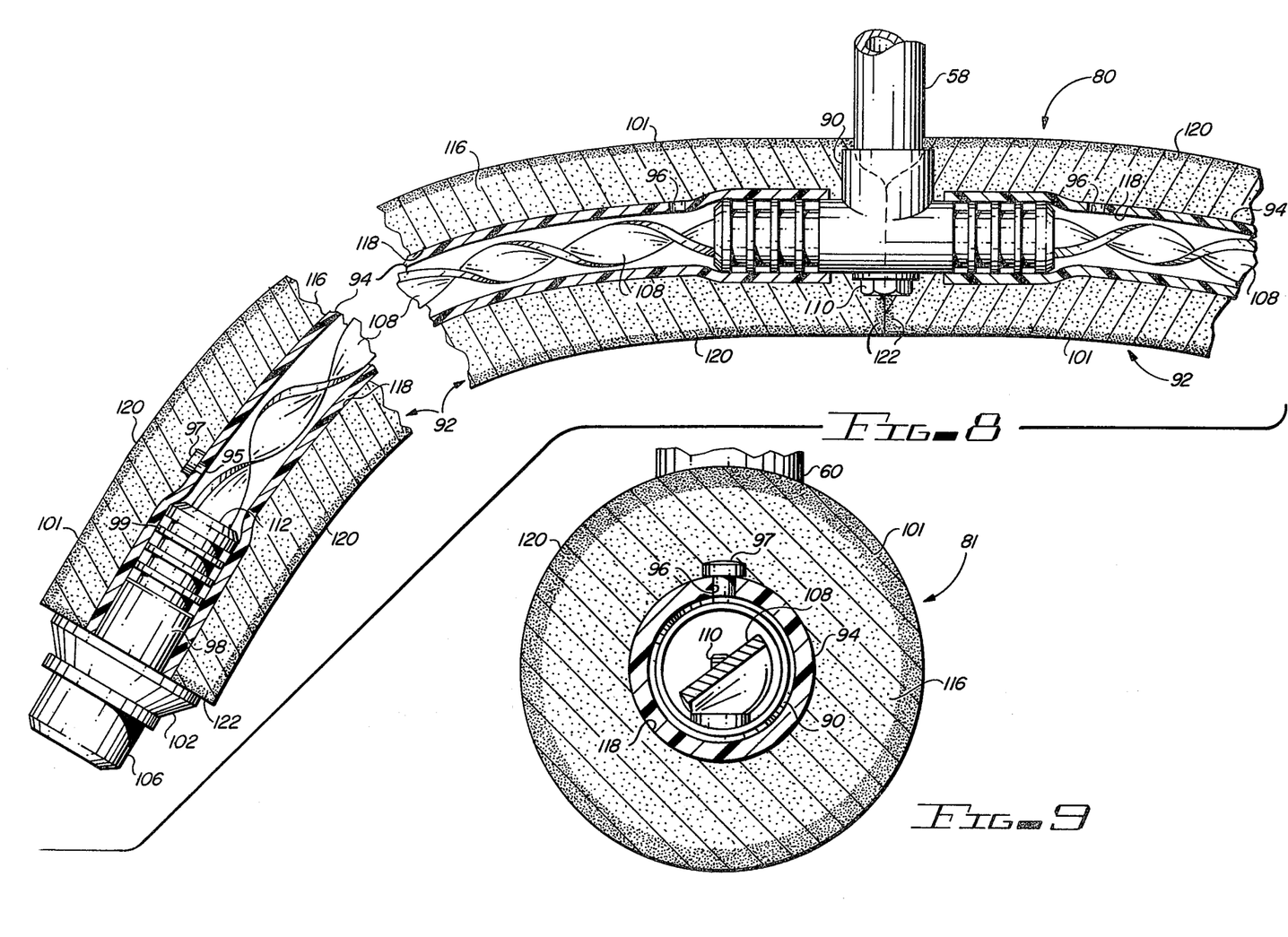
FIG. 8 is a view similar to FIG. 7 and showing the liquid flow porting arrangement employed when the wiper head assembly is deformably configured into a downwardly opening arcuate shape.
FIG. 9 is an enlarged sectional view taken along the line 9—9 of FIG. 7.

The wiper head assemblies 81 of the plural lower liquid herbicide dispenser assemblies 20 are identical structures, therefore, the following detailed description of a typical one of those wiper head assemblies, as shown in FIG. 8, will be understood to also apply to each of the plurality of wiper head assemblies 81.

A suitable tee-fitting 90 is fixedly carried on the depending end of the conduit 60 for supporting and delivering liquid herbicide to each of an identical pair of wiper arms 92 which cooperatively form the wiper head assembly 81. Each of the oppositely extending bosses 99 of the tee-fitting 90 have one of a pair of elongated flexible conduits 94, formed of a suitable material, such as plastic or rubber, sealingly attached thereto so that the herbicide will flow from the conduit 60 through the tee-fitting 90 into both of the flexible conduits. Each of the conduits 94 is provided with a liquid discharge port 95 adjacent its extending end and a similar port 96 adjacent its inwardly disposed end, with the ports 96 being closed with suitable plugs 97 as will hereinafter be described. A pair of union fittings 98 each having a barbed end 99 and a threaded end 100 (one shown) are each sealingly carried in the extending end of a different one of the flexible conduits 94 so that the threaded ends 100 extend from their respective flexible conduits. Each of the flexible conduits 94 have an elongated liquid absorbing wiper element 101 coaxially and slidably mounted thereon with the wiper elements 101 being of special configuration as will hereinafter be described in detail.

A keeper 102 of truncated conical configuration with an aperture 103 at the apex thereof is demountably carried on each of the union fittings 98 to keep the wiper elements 101 from moving axially on their respective flexible conduit 94 away from the tee-fitting 90. The keepers 102 are kept in the proper positions on the union fittings 98 by annular shoulders 104 formed integrally on the fittings and by end closing caps 106 which are threadingly mounted on the threaded ends 100 of the fittings.

An elongated substantially rigid but deformably configurable structural element means 108 is mounted intermediate its opposite ends in the bore 109 of the tee-fitting 90 such as by means of the bolt-nut arrangement 110. The deformably configurable structural element means 108 extends oppositely from its central mounting point through both of the flexible conduits 94 of the oppositely extending wiper arms 92 so that the oppositely extending ends 112 of the deformably configurable means 108 are axially received in the bores 114 of the union fittings 98, and are thus captively retained thereby. In the preferred embodiment, the deformably configurable means 108 is in the form of an elongated metal strap, such as of malleable iron, which is twisted about its longitudinal axis into a spiral-like configuration. The spiral-like twisting of the metal strap allows it to be repeatedly deformably reconfigured into a variety of desired shapes, such as those hereinbefore suggested, without the formation of localized kinking, creasing, or other more or less permanent deformation which could destroy, or at least hamper, the reconfigurability thereof.

The flexible conduits 94 and the substantially rigid but deformably configurable structural element means 108 may be referred to as forming the cores of the wiper arms 92 which extend axially through the wiper elements 101.

The elongated liquid absorbing wiper element 101 provided on each of the wiper arms 92 of the wiper head assembly 81 are preferably in the form of especially configured synthetic sponges 116. The sponges 116 are shown as being of cylindrical configuration with an axial bore 118 formed therethrough, with it being understood that various other peripheral cross sectional configurations, such as square, would work equally as well. The sponges 116 are sized as to their length so as to extend approximately between an extension of the centerline of the conduit 60, i.e., a hypothetical line bisecting the tee-fitting 90, and the keepers 102, so as to circumscribingly enclose the flexible conduits 94.

As is known in the art, manufacturing of synthetic sponges is a molding process which provides the molded product with a somewhat unsightly outer skin which is of the same material as the sponge body and is thus porous, but is of considerably denser character. In normal sponge fabrication processes, this unsightly outer skin is trimmed off for aesthetic reasons and to improve the liquid absorbing characteristics which would otherwise suffer due to the dense porous skin. Although the dense porous skin possesses liquid absorbing characteristics, it will become saturated at a much slower rate in comparison to the less dense internal sponge material. Therefore, since most sponges become saturated by absorbing liquid from the periphery into the interior sponge material leaving the dense peripheral skin on a sponge used in that manner will hamper the absorption characteristics. Thus, the dense skin is trimmed off of molded sponges to improve the absorption characteristics as well as improve the aesthetics thereof.

As will hereinafter be described in detail, the sponges 116 used in the practice of the present invention become saturated in exactly the opposite manner as conventionally used sponges, that is, the liquid is supplied to the interior of the sponges and the liquid will absorbingly move toward the periphery thereof. As a result of this reverse movement of the liquid being absorbed by the sponges 116, the dense porous peripheral skin provides distinct advantages to the initial wetting process, controlling liquid flow, and the longivity of the sponges 116. By leaving the dense porous skin on the sponges 116, the relatively slow absorption characteristics of the skin allows time for the internal sponge material to become evenly and completely saturated prior to wetting of the peripheral skin. This will effectively prevent channelization or other localized uneven wetting of the sponges which could result in uncontrollable liquid flow, or dripping, which could in turn cause destruction of crop plants. In addition to improving the liquid flow in the sponges 116, the peripheral skin is relatively tough in comparison to the internal sponge material and is thus more capable of withstanding frictional wear, tearing, and the like, which will occur during the wiping application of the liquid herbicide.

The sponges 116 are, therefore, molded in accordance with conventional fabrication techniques to provide them with desired length and peripheral configuration and the relatively dense porous peripheral skin is left in place as shown at 120 on the arcuate surfaces thereof, and as shown at 122 on the opposite ends. The axial bores 118 are formed through the sponges 116, such as by drilling.

As hereinbefore described, the lower wiper head assemblies 81 are each formed in an upwardly opening arc and as a result of this, the liquid herbicide supplied to the flexible conduits 94 is allowed to emerge therefrom through the liquid discharge ports 95 provided adjacent the extending ends thereof. In this manner, the herbicide will be supplied to the sponges 116 at their high points and gravitational forces will aid in even delivery of the herbicide to all parts of the sponges.

The upper wiper head assemblies 80 are identical, as shown in FIG. 8, wherein a typical head assembly 80 is shown, to the above described head assemblies 81 with the single exception of the herbicide porting arrangement in the two head assemblies. The upper wiper head assemblies 80 are deformably configured into downwardly opening arcuate shapes as hereinbefore described. Thus, to supply the liquid herbicide to the high points of the upper wiper head assemblies, the liquid discharge ports 96 adjacent the inwardly disposed ends of the flexible conduits 94 are left open, and the ports 95 adjacent the extending ends (one shown in FIG. 8) are closed with the plugs 97.

As hereinbefore described, the wiper head assemblies 80 and 81 may be deformably configured into virtually any configuration. Therefore, the above suggested downwardly curving shape of the upper wiper head assemblies 81 and the oppositely curving shape of the lower wiper head assemblies 80 is not intended as being limitations of those heads. Thus, the plugs 97 provided in the herbicide wiper head assemblies 80 and 81 are demountable and can be manually relocated in the liquid discharge ports 95 and 96 to suit the configuration of the heads. This relocation of the plugs 97 is accomplished by simply axially slidably pushing the ends of the liquid absorbing elements 101 to uncover the ports 95 and 96 and thus provide access thereto for relocation of the plugs 97.

The liquid discharge ports 95 and 96 are sized to restrict the liquid flow therethrough to an extent which keeps the wiper head assemblies substantially full of liquid herbicide. Such port sizing is intended to produce a head pressure in the head assemblies so that flow to a wiper arm which is lower than the oppositely extending wiper arm, due to sloping terrain, uneven adjustment, and the like, will not starve the upper one of the wiper arms.

It is to be understood that although the liquid herbicide wiper head assemblies 80 and 81 shown and described herein constitute a preferred embodiment, other embodiments may be utilized without the loss of the substantially rigid but deformably configurable characteristics. For example, the flexible conduit 94, of rubber or plastic, and the rigid but deformably configurable means 108 could be replaced with a spirally wound flexible metal conduit (not shown) of the type commonly used, for example, for coupling appliances such as stoves to natural gas lines, and the like.

While the principles of the invention have now been made clear in an illustrated embodiment, there will be immediately obvious to those skilled in the art, many modifications of structure, arrangements, proportions, the elements, materials and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A liquid herbicide applicator mechanism for mounting on a farming vehicle to wipingly apply the herbicide on undesired vegetation growing in a cultivated field as the vehicle moves therethrough, said herbicide applicator mechanism comprising:
   (a) tool bar means mountable on the farming vehicle so as to be in upwardly spaced relationship with respect to the cultivated field in which it is to be used;
   (b) reservoir means for containing a supply of the liquid herbicide; and
   (c) at least one herbicide dispenser assembly coupled to said tool bar means and coupled to receive herbicide from said reservoir means, said herbicide dispenser assembly having an elongated herbicide wiper head means for absorbing the received herbicide with said wiper head means disposed in overlaying relationship with respect to the cultivated field in which it is to be used for wipingly applying the absorbed herbicide on undesired vegetation growing therein, said herbicide wiper head means being substantially rigid but deformably configurable and being shaped into substantial conformity with the contour characteristics of the cultivated field.

2. A liquid herbicide applicator mechanism as claimed in claim 1 wherein said herbicide wiper head means of said herbicide dispenser assembly comprises:
   (a) core means for receiving the herbicide receivable in said herbicide dispenser assembly and having at least one liquid herbicide discharge port;
   (b) at least on absorbent wiper element means on said core means for absorbingly receiving the liquid herbicide from said discharge port thereof; and
   (c) said core means providing the substantially rigid but deformably configurable capability to said herbicide wiper head means.

3. A liquid herbicide applicator mechanism as claimed in claim 2 wherein said core means comprises:
   (a) at least one elongated flexible conduit one end of which is coupled to receive the liquid herbicide which is receivable by said herbicide dispenser assembly with its other end being closed and having said herbicide discharge port formed therein intermediate its ends; and
   (b) an elongated substantially rigid but deformably configurable structural element means in the bore of said flexible conduit and coextensive therewith.

4. A liquid herbicide applicator mechanism as claimed in claim 2 wherein said absorbent wiper element means is an elongated synthetic sponge having an axial bore in which said core means is disposed, said synthetic sponge having an absorbent peripheral skin which is porous and relatively dense in comparison to the internal sponge material to retard initial surface wetting of said synthetic sponge to insure even and complete internal saturation thereof prior to surface wetting and to provide said synthetic sponge with a wear resistant peripheral surface.

5. A liquid herbicide applicator mechanism for mounting on a farm vehicle for wipingly applying the herbicide on undesired vegetation growing in a cultivated field as the vehicle moves therethrough, said herbicide applicator mechanism comprising:
   (a) tool bar means mountable on the farm vehicle so as to be upwardly spaced from the cultivated field in which it is to be used and so as to lie in a substantially horizontal attitude and extend transversely of the longitudinal axis of the vehicle;
   (b) reservoir means for containing a supply of the liquid herbicide;
   (c) at least one upper herbicide dispenser assembly coupled to said tool bar means and coupled to receive herbicide from said reservoir means and having an elongated herbicide wiper head means for absorbing the received herbicide, said upper herbicide dispenser assembly disposed on said tool bar means so that said wiper head means thereof overlayingly aligns with a row of crop plants when the farm vehicle moves through the cultivated field, said wiper head means being substantially rigid but deformably configurable and being shaped in substantial conformity with the contour of the row of crop plants; and
   (d) at least one lower herbicide dispenser assembly coupled to said tool bar means and coupled to received herbicide from said reservoir means and having an elongated herbicide wiper head means for absorbing the received herbicide, said lower herbicide dispenser assembly disposed on said tool bar means so that said wiper head means thereof overlayingly aligns with the ground in the space between rows of crop plants when the farm vehicle moves through the cultivated field, said wiper head means of said lower herbicide dispenser assembly being substantially rigid but deformably configurable and being shaped in into substantial conformity with the contour of the ground in the space between the rows of crop plants.

6. A liquid herbicide applicator mechanism as claimed in claim 5 wherein said herbicide wiper head means of said upper herbicide dispenser assembly comprises:
   (a) core means for receiving the herbicide receivable in said upper herbicide dispenser assembly and having at least one liquid herbicide discharge port;
   (b) at least one absorbent wiper element means on said core means for absorbingly receiving the liquid herbicide from the discharge port thereof; and
   (c) said core means being substantially rigid but deformably configurable for shaping said herbicide wiper head means of said upper herbicide dispenser assembly into a downwardly opening curve for straddlingly overlaying the row of crop plants.

7. A liquid herbicide applicator mechanism as claimed in claim 6 wherein the liquid discharge port of said core means is located therein so as to be proximate the upwardly disposed portion of the curve into which said herbicide wiper head means of said upper herbicide dispenser assembly is deformably configured.

8. A liquid herbicide applicator mechanism as claimed in claim 6 wherein the liquid discharge port of said core means is sized for restricting the flow of the liquid herbicide therethrough to keep said core means substantially full of the liquid herbicide receivable therein.

9. A liquid herbicide applicator mechanism as claimed in claim 6 wherein said core means comprises:
(a) at least one elongated flexible conduit one end of which is coupled to receive the herbicide which is receivable in said upper herbicide dispenser assembly with said herbicide discharge port being formed adjacent that one end of said flexible conduit and having its other end closed; and
(b) an elongated substantially rigid but deformably configurable structural element means in the bore of said flexible conduit and coextensive therewith.

10. A liquid herbicide applicator as claimed in claim 6 wherein said absorbent wiper element means is an elongated synthetic sponge having an axial bore in which said core means is disposed, said synthetic sponge having an absorbent peripheral skin which is porous and relatively dense in comparison to the internal sponge material to retard initial surface wetting of said synthetic sponge to insure even and complete internal saturation thereof prior to surface wetting and to provide said synthetic sponge with a wear resistant peripheral surface.

11. A liquid herbicide applicator mechanism as claimed in claim 5 wherein said herbicide wiper head means of said lower herbicide dispenser assembly comprises:
(a) core means for receiving the herbicide receivable in said lower herbicide dispenser assembly and having at least one liquid herbicide discharge port;
(b) at least one absorbent wiper element means on said core means for absorbingly receiving the herbicide from the discharge port thereof; and
(c) said core means being substantially rigid but deformably configurable for shaping said herbicide wiper head means of said lower herbicide dispenser assembly into an upwardly opening curve for substantially conforming with the contour of the ground in the space between rows of crop plants.

12. A liquid herbicide applicator mechanism as claimed in claim 11 wherein the liquid discharge port of said core means is located therein so as to be proximate the upwardly disposed portion of the curve into which said herbicide wiper head means of said lower herbicide dispenser assembly is deformably configured.

13. A liquid herbicide applicator mechanism as claimed in claim 11 wherein the liquid discharge port of said core means is sized for restricting the flow of the liquid herbicide therethrough to keep said core means substantially full of the liquid herbicide receivable therein.

14. A liquid herbicide applicator mechanism as claimed in claim 11 wherein said core means comprises:
(a) at least on elongated flexible conduit one end of which is coupled to receive the herbicide which is receivable in said lower herbicide dispenser assembly with the other end of said flexible conduit being closed and having said herbicide discharge port formed therein proximate that closed end; and
(b) an elongated substantially rigid but deformably configurable structural element means in the bore of said flexible conduit and coextensive therewith.

15. A liquid herbicide applicator as claimed in claim 11 wherein said absorbent wiper element means is an elongated synthetic sponge having an axial bore in which said core means is disposed, said synthetic sponge having a porous absorbent peripheral skin which is relatively dense in comparison to the internal material of said sponge to retard initial surface wetting of said synthetic sponge to insure even and complete internal saturation thereof prior to surface wetting and to provide said synthetic sponge with a wear resistant peripheral surface.

16. A liquid herbicide applicator mechanism as claimed in claim 5 wherein said upper herbicide dispenser assembly comprises:
(a) an elongated conduit;
(b) means for clamping mounting said elongated conduit on said tool bar means to that said elongated conduit defines an upper end and a lower end;
(c) means on the upper end of said elongated conduit for coupling thereof to said reservoir means; and
(d) said wiper head means of said upper herbicide dispenser assembly mounted on the lower end of said elongated conduit and including,
I. a tee-fitting mounted on the lower end of said elongated conduit,
II. a pair of flexible conduits each having one end mounted on a different one of the aligned bosses of said tee-fitting so that said pair of flexible conduits extend oppositely from said tee-fitting, each of said pair of flexible conduits having a herbicide dispensing port adjacent the one end thereof and having the extending end open,
III. an elongated substantially rigid but deformably configurable strap member having its midpoint fixedly secured in said tee-fitting and extending oppositely from the aligned bosses of said tee-fitting through said pair of flexible conduits,
IV. fitting means mounted in the open extending ends of said flexible conduits to close the open extending ends and in captively retaining engagement with the extending ends of said strap member,
V. an elongated absorbent wiper element means coaxially mounted on each of said pair of flexible conduits.

17. A liquid herbicide applicator as claimed in claim 16 wherein said elongated substantially rigid but deformably configurable strap member has the portions thereof which extend oppositely from its midpoint twisted axially into spiral-like shapes.

18. A liquid herbicide applicator mechanism as claimed in claim 16 wherein said upper herbicide dispenser assembly further comprises flow control valve means in said elongated conduit for controlling the flow of the liquid herbicide receivable therein.

19. A liquid herbicide applicator mechanism as claimed in claim 18 wherein said upper herbicide dispenser assembly further comprises a transparent viewing chamber in said elongated conduit at the outlet of said flow control valve means to facilitate the regulation of the flow of liquid herbicide.

20. A liquid herbicide applicator mechanism as claimed in claim 5 wherein said lower herbicide dispenser assembly comprises:
(a) an elongated conduit;
(b) means for clampingly mounting said elongated conduit on said tool bar means so that said elongated conduit defines an upper end and a lower end;
(c) means on the upper end of said elongated conduit for coupling thereof to said reservoir means; and (d) said wiper head means of said lower herbicide dispenser assembly mounted on the lower end of said elongated conduit and including,
  I. a tee-fitting mounted on the lower end of said elongated conduit,
  II. a pair of flexible conduits each having one end mounted on a different one of the aligned bosses of said tee-fitting so that said pair of flexible conduits extend oppositely from said tee-fitting, each of said pair of flexible conduits having a herbicide dispensing port adjacent the extending end thereof with the extending end being open,
  III. an elongated substantially rigid but deformably configurable strap member having its midpoint fixedly secured in said tee-fitting and extending oppositely from the aligned bosses of said tee-fitting through said pair of flexible conduits,
  IV. fitting means mounted in the open extending ends of said flexible conduits to close the open extending ends and in captively retaining engagement with the extending ends of said strap member,
  V. an elongated absorbed wiper element means coaxially mounted on each of said pair of flexible conduits.

21. A liquid herbicide applicator as claimed in claim 20 wherein said elongated substantially rigid but deformably configurable strap member has the portions thereof which extend oppositely from its midpoint twisted axially into spiral-like shapes.

22. A liquid herbicide applicator mechanism as claimed in claim 20 wherein said lower herbicide dispenser assembly further comprises flow control valve means in said elongated conduit for controlling the flow of the liquid herbicide receivable therein.

23. A liquid herbicide applicator mechanism as claimed in claim 22 wherein said lower herbicide dispenser assembly further comprises a transparent viewing chamber in said elongated conduit at the outlet of said flow control valve means to facilitate the regulation of the flow of liquid herbicide.

* * * * *